United States Patent

[11] 3,624,804

| [72] | Inventor | Jack E. Piccardo |
| | | Oakland, Calif. |
| [21] | Appl. No. | 38,178 |
| [22] | Filed | May 18, 1970 |
| [45] | Patented | Nov. 30, 1971 |
| [73] | Assignee | Grove Valve and Regulator Company |
| | | Oakland, Calif. |

[54] FABRICATED VALVE BODY CONSTRUCTION
6 Claims, 3 Drawing Figs.

[52] U.S. Cl. .................................................. 251/367
[51] Int. Cl. .................................................. F16k 27/00
[50] Field of Search ..................................... 251/367,
366, 315; 137/454.4, 454.5, 454.6

[56] References Cited
UNITED STATES PATENTS

| 1,463,169 | 7/1923 | Lowinger .................. | 251/366 X |
| 2,032,623 | 3/1936 | Lewis ....................... | 251/367 X |
| 2,481,214 | 9/1949 | Harper ...................... | 251/367 X |
| 2,744,651 | 5/1956 | Bredtschneider ......... | 251/367 X |
| 3,091,428 | 5/1963 | Magos ....................... | 251/367 X |
| 3,100,499 | 8/1963 | Bass .......................... | 251/315 X |
| 3,214,131 | 10/1965 | Boldt et al. ............... | 251/315 X |
| 3,367,624 | 2/1968 | Scaramucci ............... | 251/315 X |
| 3,497,178 | 2/1970 | Priese ........................ | 251/315 |

*Primary Examiner*—Samuel Scott
*Attorney*—Melvin R. Stidham

ABSTRACT: A valve body construction comprising a tubular body member with a closure received in one end thereof against an internal shoulder or other inward abutment. A segmented thrust ring is received in a groove around the inner wall of the body member outward of the closure to hold it in place. A lock ring has a conical axial extension that engages complementary conical inner surfaces on the thrust ring segment to force the segments radially outward, whereby complementary wedging surfaces on the thrust ring and the wall of the retainer groove force the segments axially against the closure to clamp it in place.

INVENTOR.
JACK E. PICCARDO
BY Melvin R. Stidham
ATTORNEY

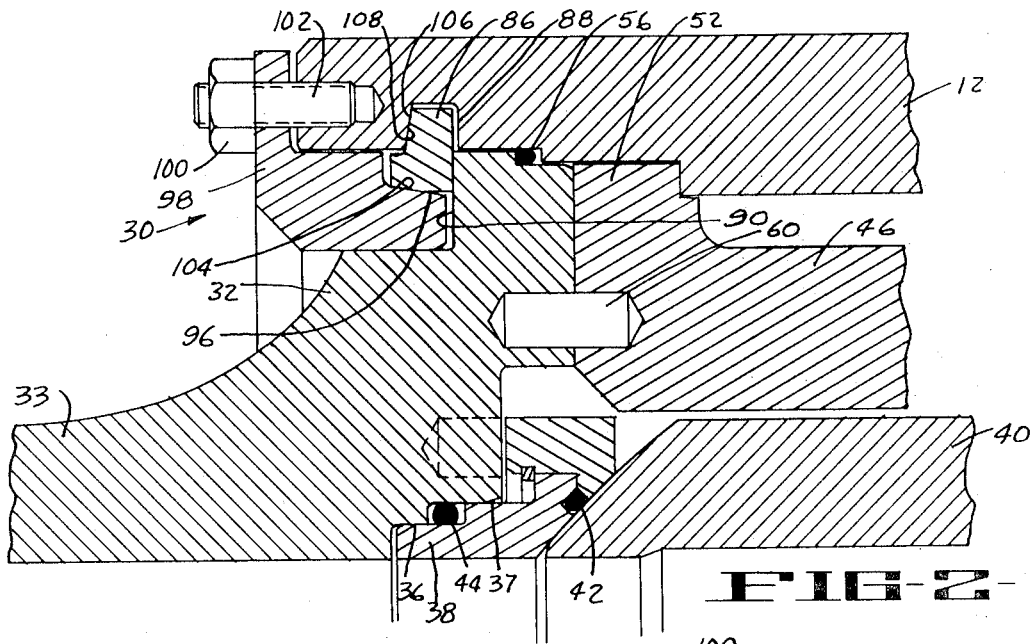
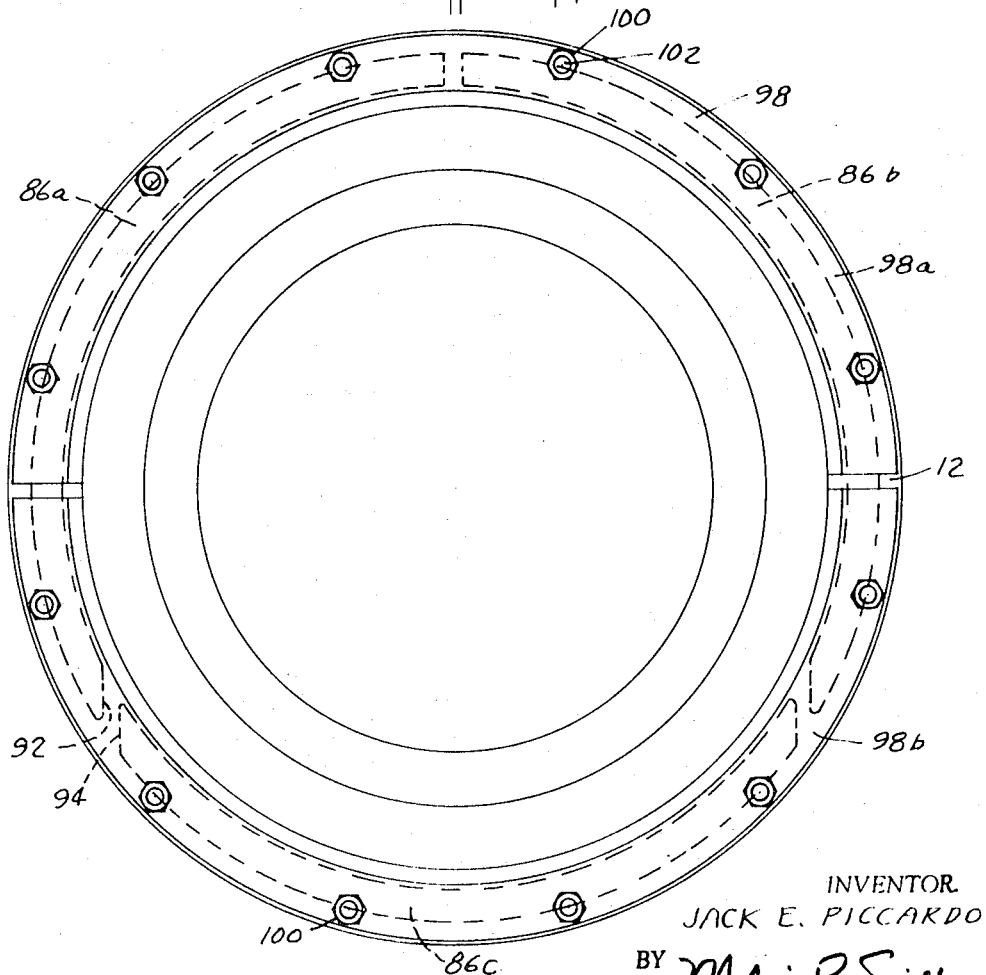

FABRICATED VALVE BODY CONSTRUCTION

BACKGROUND OF THE INVENTION

This invention relates to a fabricated valve body construction and, more particularly, to a fabricated valve body which provides convenient access to the interior for repair and replacement of internal components.

In some valves, such as gate or ball valves, it has been deemed advantageous to provide at least one removable end closure, in order to permit access for repair or replacement of internal parts. Conventionally, such end closures are held in place by bolts extending through openings therein and threaded into an end face of the body or housing. With the bolt holes being formed in the body, the thickness of the body wall has to be made excessive in order to compensate for them. In addition, with the bolts located radially outward beyond the inner surface of the body wall, there is a relatively great bending moment arm across the end closure resulting from internal pressure.

OBJECTS OF THE INVENTION

It is an object of this invention to provide a fabricated valve body construction wherein an end closure of dimensions small enough to fit within a tubular body wall to minimize the radial bending moment arm across it.

It is a further object of this invention to minimize the size and number of bolts required to hold an end closure in place.

It is a further object of this invention to provide a load-bearing member adapted to take internal pressures, leaving the bolts under relatively light load.

It is a further object of this invention to provide a valve body construction having minimum wall thicknesses.

Other objects and advantages of this invention will become apparent from the detailed description to follow, particularly when read in conjunction with the accompanying drawing.

BRIEF SUMMARY OF THE INVENTION

In a preferred embodiment of this invention, the main body member is of a generally cylindrical, tubular configuration, having at least one annular end closure with a flow passage therethrough. The end closure is clamped against an inward abutment by means of a segmented thrust ring which is received in a groove in and around the body wall axially outward of the end closure. A lock ring which is secured to the valve body end face has an axially extending, slightly conical protrusion that extends into the thrust ring segments and wedges them outward as the lock ring is forced tighter against the body end wall. This causes complementary wedging surfaces on the segmented thrust ring and on the wall of the retainer groove to force the thrust ring axially and clamp the end closure firmly in place. The thrust ring takes internal loads in shear and bearing, such loads being distributed over its circumference.

BRIEF DESCRIPTION OF THE DRAWING

FIG. 2 is enlarged partial section view of the end closure joint; and,

FIG. 3 is an end view of the valve body.

DETAILED DESCRIPTION OF THE PREFERRED EMBODIMENT

Figure 1:
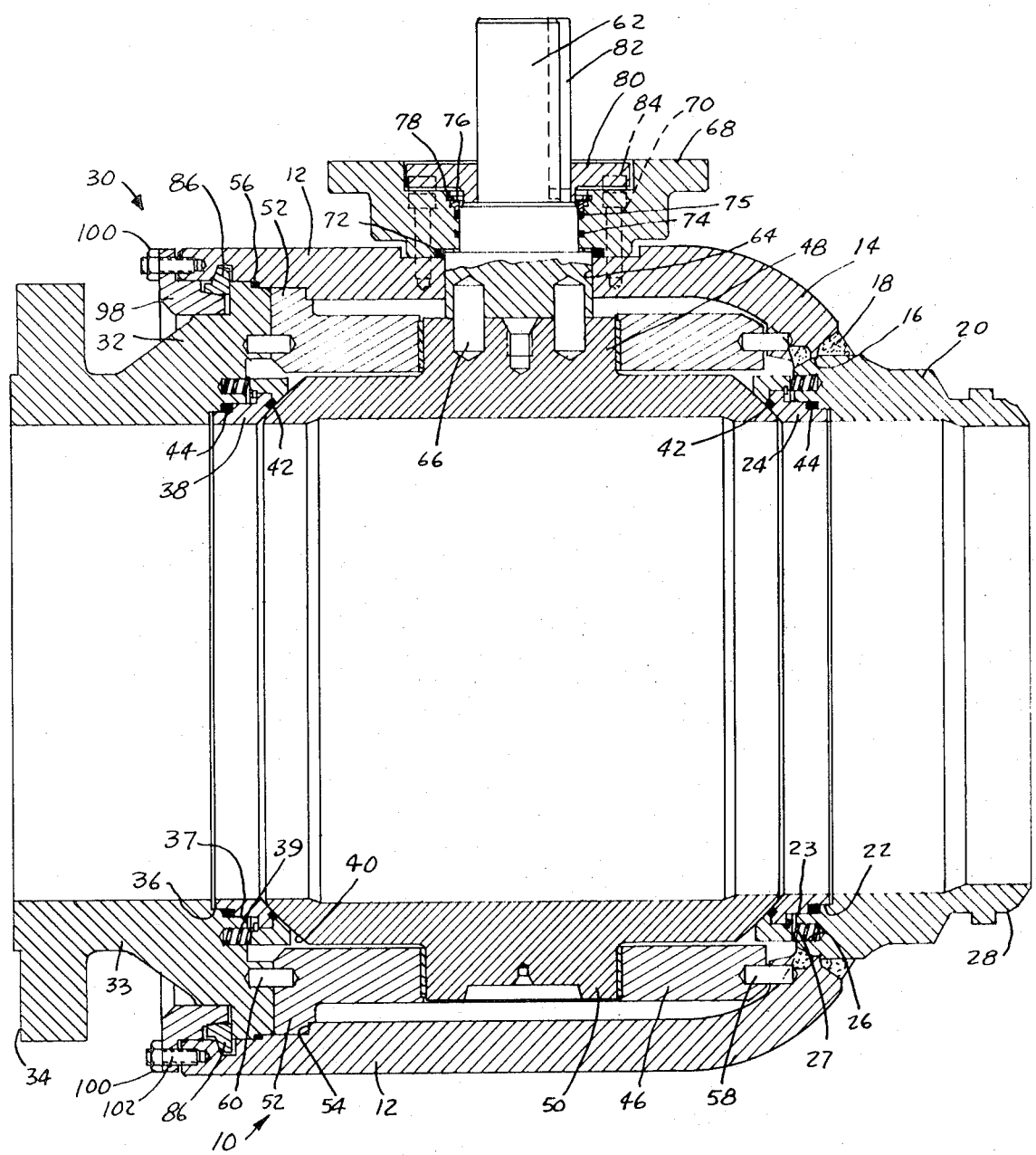
FIG. 1 is a vertical section view of the ball valve embodying features of this invention.

Referring more particularly to FIG. 1, the ball valve 10 of this invention includes a main body member 12 which is of generally cylindrical, tubular configuration over most of its length. Preferably, however, the body wall is swaged inward at one end 14 to provide an integral closure with a reduced diameter opening 16 which receives and has welded thereto at 18, a valve hub 20. Before welding the hub 20 in place, recesses 22 and 23 are bored at the inner end thereof to accommodate a seat ring 24, and a plurality of holes 26 are drilled around the inner end to accommodate biasing springs 27. In addition, the outer ends of the hubs are formed with a suitable joint, such as the weld end 28 shown, for connection into a pipeline (not shown).

Secured in place at the other end of the body 12 by means of the closure lock assembly 30 hereinafter to be described in detail, is a removable end closure 32 which may be formed with an integral hub 33 and suitable means, such as the flange 34, for connection into a pipeline. Before placement, the end closure 32 is bored at 36 and 37 to accommodate a seat ring 38 and drilled for springs 39 to bias the seat ring against the valve ball 40. Preferably, both seat rings 24 and 38 are provided with a resilient main seal, such as an O-ring 42 to seal against the ball closure 40. Suitable O-ring seals 44 are also provided to seal around the seat rings 24 and 38.

When the valve is assembled, top and bottom bearing blocks 46 are placed over top and bottom trunnions 48 and 50 and the complete assembly is placed into the body 12 before placement of the end closure 32. Flanges 52 on the ends of the bearing blocks 46 are clamped between an internal shoulder 54 in the body and the end closure 32. An O-ring 56 seals around the end closure. Pins 58 and 60 locate the bearing blocks in parallel relationship with the axis of the trunnions on the desired rotational axis.

When the valve ball 40 with bearing blocks 46 carried thereon is placed, a stem 62 is inserted through a top opening 64 in the valve body 12 with pins 66 engaged between the stem 62 and the upper trunnion 48 to transmit rotation thereto. A top mounting 68 is bolted to the valve body, as by means of capscrews 70, with an O-ring 72 sealing against the body 12. Additional O-rings 74 and 75 seal around the stem 62, with the upper O-ring 75 being retained against dislodgement by a retainer ring 76 held in place by a snapring 78. A stop plate 80 is keyed at 82 to the stem 62 to determine the open and closed positions of the valve ball 40 by engagement with the heads of capscrew stops 84.

Assembly of the valve is preferably done with the valve standing on the end 28 of the weld end hub 20, whereby the removable end closure 32 is upwardly disposed. Referring now to FIGS. 2 and 3, the end closure lock assembly 30 is shown in greater detail. A thrust ring 86, preferably formed in three or more sections 86a, 86b, and 86c is placed within a recess 88 formed in and around the valve body 12, the ring segments being placed on the then horizontal and upstanding face 90 of the end closure 32. It will be noted from FIG. 3 that one end 92 of each of the segments 86a and 86b is cut generally parallel to a diameter of the ring at 92 in order that segment 86c, similarly cut at opposite ends 94 parallel to that diameter may readily be inserted.

After the ring segments are placed within the recess 88, a sufficient distance to accommodate an axially protruding, conical end portion 96 of a lock ring 98, nuts 100 which are carried on studs 102 threaded into the body top 12, are tightened to force the lock ring 98 inward. This causes the conical surface 96 on the lock ring 98 to cam against a complementary conical surface 104 on the segmented thrust ring forcing the segments radially outward and further into the recess 88. As the thrust ring segments 86a, b and c are forced outward, a near-radial conical surface 106 on the thrust ring 88 wedges against a complementary conical wall 108 of the recess 88, respectively, to force the thrust ring segments axially inward to firmly engage the surface 90 of the end closure 32 and the end closure is in turn, forced inward firmly to clamp the flanges 52 of the bearing blocks 46, holding them firmly in place. When the end closure is thus firmly clamped, continued tightening of the nuts 100 to force the semicircular segments 98a and 98b of the lock ring 98 axially causes the wedging surface 96 on the thrust ring to drive the lock ring segment radially inward into firm clamping engagement with the end closure, thus holding it against inadvertent turning.

With the thrust ring segment 86a, 86b, and 86c firmly wedged in place, most of the load transmitted by the end closure 32 under internal pressure is taken by the segments in shear and bearing and the studs 102 are under relatively light load. The load between the end closure surface 90 and the recess wall 108 is distributed circumferentially around the thrust ring 86 segments.

While this invention has been described in conjunction with a preferred embodiment thereof it is apparent that modification and changes therein may be made by those skilled in the art without departing from the spirit and scope of this invention.

What is claimed is:

1. A valve structure comprising:
   a tubular main body member
   a closure having a flow passageway therethrough received in one end of said main body member,
   means in said body member forming an axial inward abutment for said closure,
   a groove around said body member adjacent said one end axially outward of said closure,
   a segmented thrust ring received in said groove, and
   complementary wedge surfaces on said thrust ring and said groove to produce axial inward movement of the segments on said thrust ring in response to radially outward movement of said thrust ring segments to hold said closure against said body member abutment, and
   means forcing said segmented thrust ring radially outward.

2. The valve structure defined by claim 1 including:
   a valve member
   trunnions on said valve member,
   a pair of bearing blocks rotatable receiving said trunnions
   a radial shoulder in said body member near said one end, and
   a radial flange on each of said bearing blocks engaging said shoulder
   said radial flanges forming said inward abutment for said closure, whereby said bearing blocks are clamped thereby
   said valve member with bearing blocks on said trunnions being removable through said one end of the body member when said closure member is removed.

3. The valve structure defined by claim 1 wherein said last-named means comprises:
   a segmented lock ring carried on said one end of the body member,
   an axial conical extension on said lock ring being received in said segmented thrust ring,
   the inner surface of said thrust ring being of complementary conical configuration,
   the inner surface of said lock ring is received on a complementary external surface on said closure member,
   a radial flange on said lock ring opposing the outer face of said body member, and
   a plurality of screw means engaging between said radial flange and said outer face to draw them together whereby said outer conical surfaces on said lock ring respectively, forces said thrust ring segments outward and said lock ring segments inward to grip said closure member.

4. The valve structure defined by claim 1 wherein said last-named means comprises:
   a lock ring in said one end of the body member with an axial extension thereon received in said thrust ring;
   a wedge surface on said extension to produce radially outward movement of said thrust ring segments in response to an axial movement of said lock ring.

5. The valve structure defined by claim 4 including:
   a radial flange around said lock ring opposing the outer face of said main body member, and
   a plurality of screw means extending through said flange and into said outer face to produce said axial movement.

6. The valve structure defined by claim 4 wherein:
   said lock ring is at least two segments, and including: complementary external and internal cylindrical surfaces on said closure and said lock ring, respectively, so that said axial movement of said lock ring clamps the segments thereof around said closure.

* * * * *